United States Patent [19]

Giesen et al.

[11] 4,123,235

[45] Oct. 31, 1978

[54] SEPARATION OF CARBON BLACK BY THE USE OF AN OXYGEN CONTAINING HIGHER BOILING PRODUCT

[75] Inventors: Heinz Giesen; Josef Hibbel; Willi Jansen; Sebastian Speth, all of Oberhausen, Fed. Rep. of Germany

[73] Assignee: Ruhrchemie Aktiengesellschaft, Oberhausen, Fed. Rep. of Germany

[21] Appl. No.: 820,341

[22] Filed: Jul. 29, 1977

Related U.S. Application Data

[63] Continuation of Ser. No. 602,238, Aug. 6, 1975, abandoned.

[30] Foreign Application Priority Data

Aug. 23, 1974 [DE] Fed. Rep. of Germany ....... 2440473

[51] Int. Cl.² .............................................. B01D 11/02
[52] U.S. Cl. ......................................... 55/85; 55/89; 210/21; 210/73 W; 210/83
[58] Field of Search .................... 110/31; 210/21, 22, 210/49, 73 W, 83, 322; 366/315; 55/85, 89

[56] References Cited

U.S. PATENT DOCUMENTS

| 2,903,423 | 9/1959 | Mundria et al. | 210/21 |
| 3,148,140 | 9/1964 | Kaiser et al. | 210/21 |
| 3,276,995 | 10/1966 | McDonald, Jr. | 210/21 |
| 3,349,029 | 10/1967 | Cheng | 210/21 |
| 3,917,569 | 11/1975 | Richter et al. | 210/21 |

*Primary Examiner*—Frank A. Spear, Jr.
*Attorney, Agent, or Firm*—Bierman & Bierman

[57] ABSTRACT

A process for separating carbon black from a liquid containing it is disclosed wherein a particular amount of an oxygen containing higher boiling product which is the non-volatile residue produced as a by-product of the oxo-synthesis is added to the liquid whereby the carbon black passes into the higher boilng product phase to form an admixture. The admixture is passed to a settling zone where it separates from the liquid. Separation of the carbon black then takes place through the use of a disk centrifuge.

9 Claims, 1 Drawing Figure

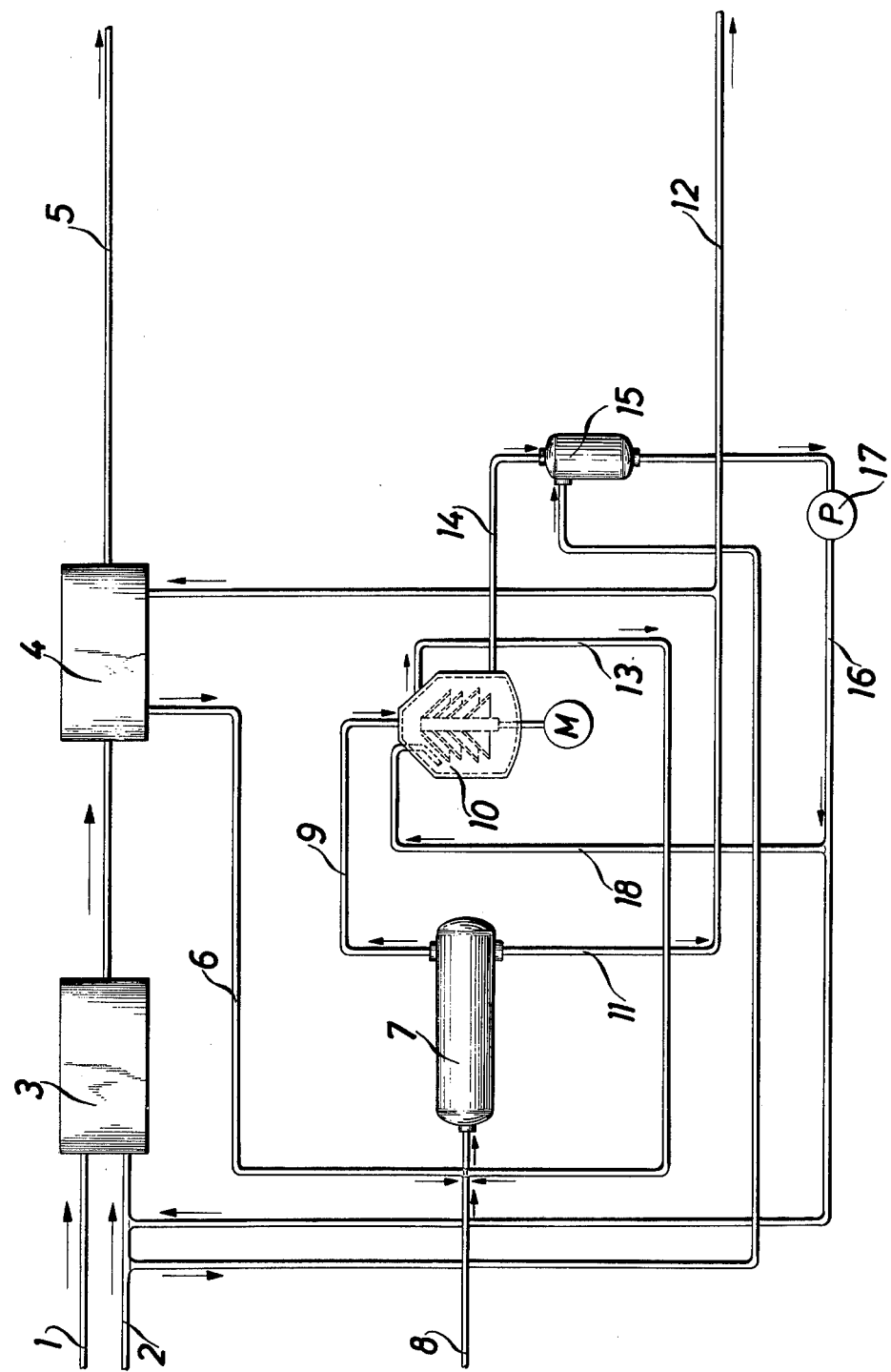

SEPARATION OF CARBON BLACK BY THE USE OF AN OXYGEN CONTAINING HIGHER BOILING PRODUCT

BACKGROUND OF THE INVENTION

This application is a continuation of Ser. No. 602,238, filed Aug. 6, 1975, now abandoned.

This application claims the priority of German Patent Application No. P 24 40 473.7 filed Aug. 23, 1974.

One very useful source of energy is a product known as synthesis gas. This is an equimolar mixture of carbon monoxide and hydrogen and is produced from petrochemical raw materials. More specifically, any hydrocarbons such as propane, gasoline, liquefied gas, natural gas, and including crude oil, heavy oil, tar and asphalt are reacted with hydrogen under conditions creating incomplete combustion. Usually, these hydrocarbons are reacted with oxygen in an amount which is insufficient for complete combustion in an open flame and in the absence of a catalyst. The reaction is generally carried out at temperatures of approximately 1300° C. and at pressures up to 90 bar. It has been known that pressures can go as high as 160 bar at least in pilot plants.

The products of this reaction include hydrogen sulfide, carbon monoxide, methane, carbon dioxide and hydrogen, all of which are thermodynamically stable under the reaction conditions. Carbon black, although not an equilibrium partner under these conditions, is unavoidably formed. When natural gas is reacted, a minor amount of carbon black is produced. In the case of residual oils, the quantity of carbon black will normally amount to approximately 2 to 4% of the carbon content.

When producing synthesis gas from petrochemical raw materials by processes carried out on a commercial scale, the hydrocarbons and oxygen are separately preheated and introduced into the reactor through one or more burners. The burners may be water-cooled and they permit rapid and intimate mixing of the reactants. The hot gas leaving the reactor (having a temperature of 1400° to 1500° C.) is cooled in a waste heat boiler. Thereafter the carbon black is removed from the raw gas by scrubbing with water. Then the pre-purified gas is desulfurized and, if necessary or desired, passes to a carbon monoxide converter. Finally, carbon dioxide, hydrogen sulfide, and carbon oxysulfide are largely removed in the gas scrubbing unit downstream of the converter. In certain cases, e.g. if the gas is to be used for synthesis of ammonia, a more complete purification is necessary.

Carbon black can be removed from the raw synthesis gas without any difficulty by simple scrubbing with water. However, problems are encountered when attempting to further utilize the carbon black, especially when returning it into the process, which is desirable for reasons of economy.

In one known process, the total carbon black is returned into the reactor in a closed system. To this end, the carbon black-containing water is mixed in a decanter with naphtha, i.e. a gasoline fraction having a boiling range of about 70° to 112° C. This has the result that the total carbon black passes over into the naphtha phase. After having separated the two phases, water which is free from carbon black is withdrawn from the decanter. The carbon black-containing naphtha is mixed with part of the feed oil and distilled off as the overhead fraction in a distilling column. The oil with the total carbon black remains as bottoms in the column. After being mixed with the remaining feed oil, it is passed to the preheater and thence into the reactor where it is completely gasified.

In another known process, small amounts of feed oil are admixed with the carbon black-containing water. The carbon black passes over into the feed oil phase and, with an appropriately high concentration, forms semi-solid carbon black-oil pellets. The clarified water is separated from the black-oil pellets by means of screens. The clarified water is returned into the process and the carbon black-oil pellets are ground to a slurry with the addition of further feed oil and either passed to a combustion unit or returned into the process as gasification agent.

Both of the known processes of carbon black separation have substantial disadvantages. The separation of carbon black by means of large amounts of naphtha causes the substantial expense of distillation for the recovery of the naphtha, and the separation of carbon black with small amounts of feed oil results in a not inconsiderable pollution of the environment by vapors containing noxious materials. In addition, there are technical difficulties as well.

SUMMARY OF INVENTION

Accordingly, it is an object of this invention to provide a process which overcomes the difficulties mentioned above and permits the treatment and processing of carbon black-containing effluent waters in a manner which is satisfactory from both the technical and economical point of view.

It has now been found that the higher boiling materials (thick oils) obtained as by-products in the oxo synthesis (i.e. in the reaction of olefins with carbon monoxide and hydrogen) can be used with particular advantage for the separation of carbon black from suspensions of carbon black and water. Of course, such a mode of operation is particularly advisable if an oxo synthesis plant is arranged downstream of the synthesis gas production plant and sufficient amounts of thick oil are available. Thick oil is the non-volatile residue remaining after distillation of the aldehydes and alcohols containing one carbon atom more than the starting olefin which are the main products of the oxo synthesis. It consists substantially of higher alcohols, aldehydes, acetals, carboxylic acids and esters which are produced from the primary products by consecutive reactions such as the aldol condensation or Tischtschenko reaction. For example, when hydroformylating propylene, the higher boiling by-products formed include, inter alia, 2-ethyl hexanal, 2-ethyl hexenal and butyl acetals thereof, n- and i-butyl formate, the symmetrical and asymmetrical dibutyl ethers, n- and i-butyl esters of normal and isobutyric acid, trimeric butyraldehydes and the butyrates of 2-ethyl hexanediol.

Carbon black is separated from synthesis gas by scrubbing with water. According to the process of this invention, the carbon black is removed from the water by contacting the water with an immiscible organic liquid. Particularly preferred for this purpose is the thick oil obtained as a by-product in the oxo synthesis. The resultant suspension of carbon black and thick oil is subsequently concentrated in a disk centrifuge.

The capacity of the thick oil for carbon black is excellent, and the separation of the suspension of carbon black and thick oil proceeds extremely rapidly and completely. Only small amounts of thick oil (less than 0.5% by weight) remain in the water phase which is returned for the most part into the carbon black scrubbing unit. This thick oil may be driven off from the aqueous phase by flash evaporation. A carbon black concentration of 10 to 15% can be achieved in the thick oil enriched with carbon black. This concentrate is generally returned as feed material into the gasification plant.

The concentration of the suspension of thick oil and carbon black can be controlled by recirculation to the disk centrifuge. By adding feed oil (which has not been mixed in the centrifuge with the thick oil used for extraction of carbon black) to this stream, the consumption of thick oil can be further reduced so that adaptation to the amount available from the oxo process is possible.

It was assumed heretofore when separating carbon black from scrubbing water that it is necessary, for the complete extraction of the carbon black from the aqueous phase, to use liquid hydrocarbons which are free from carbon black. In this manner, it was intended above all to prevent very fine carbon black particles from remaining suspended in the water. Therefore, the hydrocarbons have been separated from the hydrocarbon-carbon black suspension by distillation. Moreover, the extent and the effect of the mechanical separation of part of the suspension liquid on the economy of the overall process were underestimated.

Surprisingly, it has been found that it is not necessary for treating and processing carbon black-containing water to use suspending agents which have been thoroughly purified from small carbon black particles. Rather, it is possible to use suspending agents which do contain small carbon black particles. Therefore, the bulk of the thick oil can be mechanically separated from the carbon black-thick oil suspension. In accordance with the invention, this is effected by the use of disk centrifuges which ensure sufficient separation of the liquid and solid phases. It is possible in this manner to separate 80 to 90% of the thick oil contained in the suspension.

BRIEF DESCRIPTION OF THE PREFERRED EMBODIMENT

The drawing is a process diagram of the invention.

Oxygen and fuel oil are passed through lines 1 and 2 and into a gasification reactor 3. The synthesis gas, consisting of carbon monoxide and hydrogen and containing carbon black, is freed from this carbon black by means of water in scrubber 4. The synthesis gas is passed on to further use through line 5. The mixture of carbon black and water passes through line 6 and into decanter 7, into which thick oil is simultaneously introduced through line 8. Separation of phases takes place in the decanter 7.

The thick oil/carbon black suspension leaves decanter 7 through line 9 while the clarified water is withdrawn through line 11 and returned as recycle water into scrubber 4. Excess water is removed from the process through line 12. The thick oil-carbon black suspension emerging through line 9 from decanter 7 is introduced into disk centrifuge 10 in which separation into a phase enriched with carbon black and a clarified phase takes place. The clarified phase emerges through line 13 (the thick oil having a residual content of carbon black of about 0.3%) and is returned to decanter 7.

The concentrated phase (having a carbon black content of 10 to 15%) leaves the separator 10 through a line 14 and is mixed with feed oil in a mixer 15. It is then passed by means of pump 17 through line 16 and into gasification reactor 3. A partial stream is recirculated through line 18 before the nozzles of the disk centrifuge.

EXAMPLE

The test was performed with a disk centrifuge which had the following characteristics:

| | |
| --- | --- |
| disk diameter | 160 mm |
| number of disks | 37 |
| distance between the disks | 0,5 mm |
| diameter of separation layer | approx. 125 mm |
| rate of revolutions | 9500 revolutions per minute |
| centrifugal acceleration | 5000–6000 acceleration due to gravity |

300 liter per hour of a mixture coming from the carbon black separation consisting of thick oil, carbon black (with a carbon black charge of 22 gram carbon black per liter thick oil) and residual water with a temperature of 80° C. were introduced into the disk centrifuge by pipe 9. During the test, which lasted 2 hours, the quantity per time unit of the introduced liquid (300 liter per hour) and the quantity per time unit of the clarified liquid from pipe 13 (220 liter per hour) were measured continuously. The quantity of concentrated carbon black sludge was determined by collecting in a receiver and found to be 80 liter per hour on average. Samples of the sludge and clarified liquid were collected regularly at 15 min. intervals and analysed. The analysis of all samples showed that the concentration of solids in the carbon black sludge was in the range of 70 to 85 gram carbon black per liter thick oil. A residual amount of solid between 0.01 and 0.6 gram carbon black per liter thick oil was found in the clarified liquid. The mechanically separated thick oil could be reintroduced immediately to the separation of carbon black from the carbon black-water suspension.

What is claimed is:

1. A process for separating carbon black from a liquid containing it comprising
    (a) adding 20 to 100 parts of at least one oxygen containing higher boiling product which is the nonvolatile residue produced as a by-product of the oxo-synthesis per part of carbon black to said liquid to form a first mixture and whereby said carbon black passes into the oxygen containing product phase to form an admixture
    (b) passing said first mixture into a settling zone,
    (c) separating said admixture from said liquid by the method comprising
        (1) permitting said admixture to form a layer upon the surface of said liquid, and
    (d) passing said layer through a disk centrifuge having a plurality of conical disks.

2. The process of claim 1 wherein the step of passing said layer through said disk centrifuge further comprises separating said layer into the bulk of said oxygen containing product and a second mixture containing the remainder of said oxygen containing product and carbon black, recycling said bulk of said oxygen containing product to contact said liquid containing said carbon black, and distilling said second mixture to remove substantially all of said oxygen containing product from said carbon black.

3. The process of claim 2 wherein said carbon black is contained in a liquid, said carbon black and said liquid constituting a blend, said blend results from scrubbing a gas immiscible in said liquid and containing carbon black.

4. The process of claim 3 wherein said liquid is recycled to the scrubbing step.

5. The process of claim 3 wherein said liquid is water and said gas is synthesis gas.

6. The process of claim 5 wherein said liquid is recycled to the scrubbing step.

7. The process of claim 2 wherein said bulk is at least 80% of the total amount of said oxygen containing product in said mixture.

8. The process of claim 7 wherein said bulk is 80–90% of the total amount of said oxygen containing product in said mixture.

9. The process of claim 2 wherein said recycled oxygen containing product is not free from carbon black.

* * * * *